(12) United States Patent
Mukhopadhyaya et al.

(10) Patent No.: US 10,855,567 B1
(45) Date of Patent: Dec. 1, 2020

(54) DYNAMIC CAPACITY ASSESSMENT OF DEVICES IN A DATA CENTER

(71) Applicant: Equinix, Inc., Redwood City, CA (US)

(72) Inventors: Utpal Mukhopadhyaya, San Jose, CA (US); Sindhu Payankulath, Fremont, CA (US); Syed Nawaz, Santa Clara, CA (US); Kaladhar Voruganti, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 222 days.

(21) Appl. No.: 15/222,129

(22) Filed: Jul. 28, 2016

Related U.S. Application Data

(60) Provisional application No. 62/355,234, filed on Jun. 27, 2016.

(51) Int. Cl.
*H04L 12/26* (2006.01)

(52) U.S. Cl.
CPC .......... *H04L 43/0876* (2013.01); *H04L 43/18* (2013.01)

(58) Field of Classification Search
CPC .......................... H04L 43/0876; H04L 43/18
USPC ....................................................... 709/224
See application file for complete search history.

(56) References Cited

U.S. PATENT DOCUMENTS

| | | | | |
|---|---|---|---|---|
| 6,862,623 B1* | 3/2005 | Odhner | ............... | G06Q 10/06 709/224 |
| 8,418,181 B1* | 4/2013 | Sirota | ............... | H04L 67/00 709/201 |
| 9,313,604 B1* | 4/2016 | Holcombe | ............ | H04W 28/06 |
| 9,699,109 B1* | 7/2017 | Sait | ............... | G06F 9/45558 |
| 9,843,520 B1* | 12/2017 | Haltore | ............... | H04L 47/125 |
| 10,088,818 B1* | 10/2018 | Mathews | ............ | H04L 12/2825 |
| 2003/0004746 A1* | 1/2003 | Kheirolomoom | ...... | G06Q 10/10 717/104 |
| 2014/0337086 A1* | 11/2014 | Asenjo | ............... | G06Q 10/0635 705/7.28 |
| 2015/0271102 A1* | 9/2015 | Antich | ............... | H04L 47/825 370/230 |

(Continued)

OTHER PUBLICATIONS

U.S. Appl. No. 15/099,407, by Juxiang Teng, filed Apr. 14, 2016.
U.S. Appl. No. 15/001,766, by Ravindra JN Rao, filed Jan. 20, 2016.

*Primary Examiner* — Joseph L Greene
(74) *Attorney, Agent, or Firm* — Shumaker & Sieffert, P.A.

(57) ABSTRACT

In some examples, a computing device comprises at least one computer processor; and a memory comprising instructions that when executed by the at least one computer processor cause the at least one computer processor to: receive feature usage data indicating respective usages of a plurality of network device features configured for the network device; receive resource utilization data indicating resource utilization of the network device resource by each of the network device features at different usages; determine, based on the features usage data and the resource utilization data, respective resource utilizations of the network device resource by the plurality of network device features; combine the respective resource utilizations of the network device resource to determine a total network device resource utilization for the network device resource; and output an indication of the total network device resource utilization for the network device resource.

18 Claims, 8 Drawing Sheets

(56) References Cited

U.S. PATENT DOCUMENTS

2016/0094724 A1* 3/2016 Lemchak .......... H04M 15/8094
455/414.1

* cited by examiner

DYNAMIC CAPACITY ASSESSMENT OF DEVICES IN A DATA CENTER

This application claims the benefit of U.S. Provisional Application No. 62/355,234 file Jun. 27, 2016, the entire content of which is incorporated herein by reference.

TECHNICAL FIELD

This disclosure relates to computer networks and, more specifically, to data centers for colocation and interconnection.

BACKGROUND

A network services exchange provider or colocation provider (a "provider") may employ a communication facility, such as a data center or warehouse, in which multiple customers of the provider locate network, server, and storage gear and interconnect to a variety of telecommunications and other network service provider(s) with a minimum of cost and complexity. Such customers are said to be "colocated" in the data center. Data centers may be shared by the multiple tenants locating networking equipment within the data centers. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "colocation facility." The facility provider may provide services accessible to colocated customers via an interconnection, such services including, for example, a cloud exchange, Internet access, an Internet exchange, "metro connect" for reaching other communication facilities of the provider within a metropolitan area, a cross-connect from one customer to another, and other interconnection services.

As the number of customers grows, more network device resources of network devices deployed by the co-location providers are consumed. Conventionally, colocation facility providers assess available capacity of network devices based on data points, such as the number of available ports and/or amount of available forwarding bandwidth in a network device. Capacity assessments based on this kind of criteria may lead a colocation facility administrator to (1) make overly conservative estimate of resource consumption, which leads to unnecessary deployment of more routers, switches, line cards, and/or servers in the data center thereby wasting expensive network resources, or (2) make an aggressively tight estimate of resource consumption, which pushes the network device utilization close to its scale limits thereby risking failure of the device.

SUMMARY

In general, this disclosure describes techniques for dynamically assessing capacity of resources of network devices that provide interconnection and other network services to customers located in a colocation facility. For example, the techniques may include generating a multi-dimensional capacity model for a network device that is based on respective resource utilization data for multiple individual features supported by the network device in providing various network services, such as packet forwarding, network address translation, virtual private networking, and other network services. The resource utilization data may be obtained from the network device vendor and may include utilizations of network device resources (e.g., control processor memory, control processor CPU, cache space, forwarding processor memory, forwarding processor CPU, various special purpose memories used within the network device such as TCAM etc.) for various network device features (e.g., routes, virtual routing and forwarding instances (VRFs), network address translations, access control lists (ACLs), Quality of Service (QoS), network traffic flows (Netflows) etc.) used to provide network services. Based on capacity models for various network devices used to provide the colocation facility network, a colocation facility provider may dynamically assess available capacity of the colocation facility network to determine whether the network devices of the colocation facility network have the requisite capacity to accommodate a prospective network service that requires one or more of the network device features.

In some examples, a method includes receiving, by a capacity model unit and executing at a computing device, feature usage data indicating respective usages of a plurality of network device features configured for a network device. The method also includes receiving, by the capacity model unit, resource utilization data indicating resource utilization of the network device resource by each of the network device features at different usages. The method further includes determining, by the capacity model unit based on the features usage data and the resource utilization data, respective resource utilizations of the network device resource by the plurality of network device features. The method further includes combining, by the capacity model unit, the respective resource utilizations of the network device resource to determine a total network device resource utilization for the network device resource. The method further includes outputting, by the capacity model unit, an indication of the total network device resource utilization for the network device resource.

In some examples, a computing device includes at least one computer processor and a memory comprising instructions that when executed by the at least one computer processor cause the at least one computer processor to: receive feature usage data indicating respective usages of a plurality of network device features configured for a network device; receive resource utilization data indicating resource utilization of the network device resource by each of the network device features at different usages; determine, based on the features usage data and the resource utilization data, respective resource utilizations of the network device resource by the plurality of network device features; combine the respective resource utilizations of the network device resource to determine a total network device resource utilization for the network device resource; and output an indication of the total network device resource utilization for the network device resource.

In some examples, a system includes a colocation facility comprising network infrastructure to provide one or more network services to customer networks of customers colocated within the colocation facility. The system further includes a programmable network platform configured for execution by one or more computing devices of a colocation facility provider for the colocation facility to configure the network infrastructure to provide the one or more networks services, the programmable network platform configured to: receive feature usage data indicating respective usages of a plurality of network device features configured for a network device; receive resource utilization data indicating resource utilization of the network device resource by each of the network device features at different usages; determine, based on the features usage data and the resource utilization data, respective resource utilizations of the network device resource by the plurality of network device features; combine the respective resource utilizations of the network device resource to determine a total network device resource utilization for the network device resource; and output an indication of the total network device resource utilization for the network device resource.

The details of one or more techniques of the disclosure are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
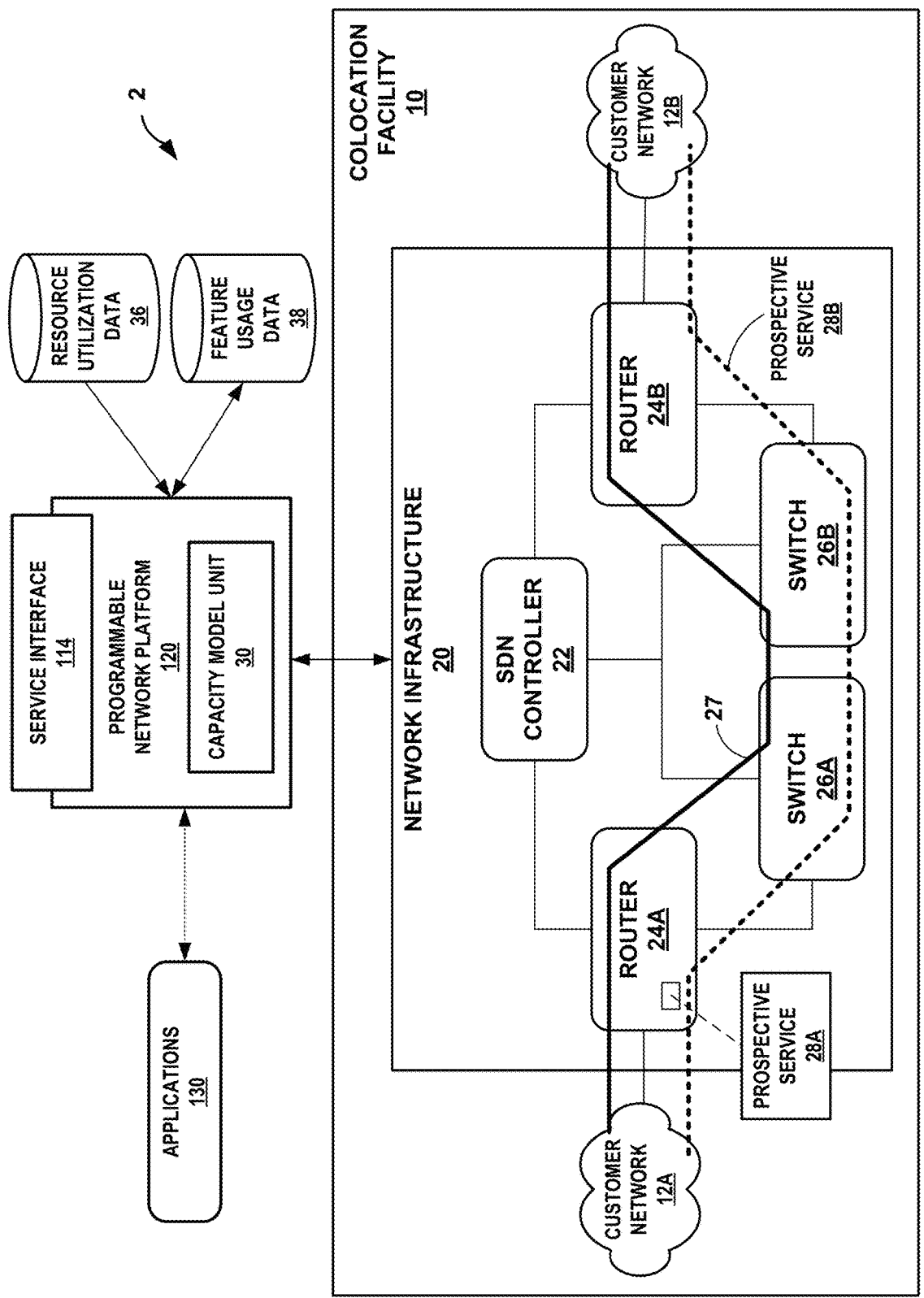
FIG. 1 is a block diagram that illustrates an interconnection system having a programmable network platform that offers dynamic capacity assessment of network device resources of a colocation facility, in accordance with some example implementations described herein.

FIG. 1 is a block diagram that illustrates an interconnection system 2 having a programmable network platform 120 that offers dynamic capacity assessment of network device resources of a colocation facility 10, in accordance with some example implementations described herein. In the example of FIG. 1, interconnection system 2 depicts a network infrastructure 20 within a colocation facility 10 that provides network services to customer networks 12A, 12B (collectively, "customers 12") to, for instance, exchange data with one another via the network infrastructure. Although FIG. 1 is shown with two customers, interconnection system 2 may include one or more additional customers colocated in the colocation facility 10 to receive network services from the colocation facility 10 provider. As used herein, the term "customer" indicates that the customer purchases colocation, interconnection and other network services from the colocation facility 10 provider, and receives such services by colocating within the colocation facility 10 to, e.g. lease space and/or power to access services provided at colocation facility 10. Interconnection system 2 includes network infrastructure 20 deployed by the colocation facility 10 provider within the colocation facility 10 to interconnect and provide other network services to customer networks 12.

Customers that colocate respective customer networks 12 may each represent a cloud service provider ("CSP"), a network service provider/carrier ("NSP"), and an enterprise. Customers 12 of colocation facility 10 may interconnect for such end-uses as service delivery, content delivery, financial services, and Internet access, to give just a few examples.

In colocation facility 10, space and power may be partitioned and leased to customers 12 in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) colocated in the colocation facility 10 or, e.g., another colocation facility managed by the interconnection system provider. Customers 12 may lease space within the colocation facility 10 in order to colocate with other tenants for improved efficiencies over independent facilities as well as to interconnect network equipment with the network equipment of other tenants/customers within the colocation facility 10 or campus for reduced latency/jitter and improved reliability, performance, and security versus transport networks, among other reasons. Colocation facility 10 may host numerous customers, e.g., customers 12, and their network, server, and/or storage gear. Each of customers 12 may have particular reasons for choosing to colocate at colocation facility 10, including capacity, geographical proximity, connecting to other customers, colocating with other customers, and price.

Interconnection system 2 may provide one or more different types of interconnection services via network devices of network infrastructure 20 between customers 12 colocated in colocation facility 10. For instance, colocation facility 10 may provide physical or "layer-1" (in the Open Systems Interconnection model (OSI Model)) interconnections between customers 12. Physical interconnections may include physical cross-connects that are established by category 5 or 6 (cat 5/6) cables, coaxial cables, and/or fiber optic cables, for instance. In some examples, colocation facility 10 may provide data link or "layer-2" (in the OSI Model) interconnections between customers 12. In some examples, colocation facility 10 that provides layer-2 interconnections may be referred to as an Ethernet Exchange, where Ethernet is the underlying layer-2 protocol. In some examples, colocation facility 10 may provide network and/or transport or "layer-3/4" (in the OSI Model) interconnections between customers 12. In some examples, colocation facility 10 may provide layer-3/4 interconnections (referred to an Internet Exchange), where TCP/IP is the underlying layer-3/4 protocols. For example, colocation facility 10 may provide an Internet Exchange to allow routers of customers 12 to directly peer with one another using a layer-3 routing protocol, such as Border Gateway Protocol, to exchange routes for facilitating layer-3 traffic exchange to provide private peering. In some examples, colocation facility 10 may provide indirect layer-3 routing protocol peering whereby each of customers 12 announces its layer-3 routes to an autonomous system (AS) deployed by the colocation facility provider within the colocation facility network infrastructure 20 to provide private peering mediated by the AS. The AS may then relay these routes in conjunction with tunneling or other forwarding mechanisms to establish an interconnection between customers 12. In some examples, colocation facility 10 may provide indirect layer-3 routing protocol peering to facilitate service traffic exchange (referred to as a Cloud-based Services Exchange or, more simply, a Cloud Exchange). Additional description of exchanges are found in U.S. patent application Ser. No. 15/099,407, filed Apr. 14, 2016, entitled "CLOUD-BASED SERVICES EXCHANGE," and U.S. patent application Ser. No. 15/001,766, filed Jan. 20, 2016, entitled "MULTI-CLOUD, MULTI-SERVICE DATA MODEL," the entire content of each of which being incorporated by reference herein. As used herein, an interconnection is an example of a network service provided by network devices of network infrastructure 20.

Network devices of network infrastructure 20 of interconnection system 2 may provide network services in addition or in the alternative to interconnection services. For example, network infrastructure 20 may provide one or more of network address translation (NAT) services, firewall services, address allocation, deep packet inspection (DPI), subscriber management, billing and/or policy enforcement, content delivery networking (CDN), and other network services.

In some examples, network infrastructure 20 may include network devices such as SDN controller 22, routers 24A, 24B (collectively, "routers 24"), and/or switches 26A, 26B (collectively, "switches 26") to provide customers 12 with access to network services. The number of network devices within network infrastructure 20 is illustrated for exemplary purposes and may include any number of network devices to provide customers 12 with access to network services of interconnection system 2. Each network device 24, 26 includes a number of resources and features to provide access to the network services. For example, router 24A may include network device resources for implementing features offered by the router 24A, such network device resources including control plane central processing unit ("CPU"), data plane CPU, control plane memory, data plane memory, ports, line cards, and other network device resources. A network device feature may include a logical component of the network device that provide support for a network service and utilizes hardware-based network device resources to implement the network service. For example, network device features may include virtual routing and forwarding instances ("VRFs"), route tables, media access control ("MAC") addresses in an address resolution protocol ("ARP") database, network address translation ("NAT") entries, and other features supported by network devices to implement network services configured by an operator (either directly or via a configuration device such as SDN controller 22).

In some examples, each of customers 12 may request one or more network services from the colocation facility 10 provider. Programmable network platform 120 ("PNP 120") may represent an application executing within one or more data centers of system 2 or alternatively, off-site/remotely at a back office or branch of the colocation facility provider, for instance. Although shown as administering a single colocation facility 10, programmable network platform 120 may control service provisioning for multiple different colocation facilities. Alternatively, or additionally, multiple separate instances of the programmable network platform 120 may control service provisioning for respective multiple different colocation facilities. Programmable network platform 120 may include service interface 114 that may exchange information with applications 130 to receive service requests, for instance.

Application(s) 130 represents at least one application that communicates with PNP 120 to request services for a customer. Application(s) 130 represent client-side software for interfacing with PNP 120 and may include a customer portal, customer applications, and/or a console such as a command-line interface or graphical user interface. Users or clients of application(s) 130 may include customers associated with customer networks 12, e.g., enterprise customers, cloud service and content providers, carriers, network service providers (NSPs). Users of application(s) 130 may also include operators/administrators of the colocation facility 10 provider. In some examples, application(s) 130 and PNP 120 may represent different functions or modules of the same application.

Network devices of network infrastructure 20 are individually configured to provide one or more network services. In some cases, as with network service 27, multiple network devices are configured to cooperatively provide a single network service. In the example of FIG. 1, network infrastructure 20 is configured with a network service 27 to interconnect customer networks 12. Network service 27 in this example represents an interconnection service (e.g., a virtual circuit for a layer 2 or layer 3 interconnection).

In accordance with techniques of this disclosure, capacity model unit 30 provides dynamic multi-dimensional feature capacity assessment of network device resources within a colocation facility for capacity planning and, in some cases, to determine whether network device resources of one or more network devices of the network infrastructure 20 have resource capacity to accommodate the network device features needed to support one or more prospective network services 28A-28B (collectively, "prospective service 28") such as a new network service and/or a different network service. As described in further detail below, capacity model unit 30 may assess the capacity of network device resources of network devices 24, 26, e.g., to accommodate additional network device features required for implementing a prospective service 28 based at least in part on resource utilization data 36.

In the example of FIG. 1, capacity model unit 30 is depicted as a component of programmable network platform 120. Capacity model unit 30 may represent a stand-alone application executed by a computing device separate from and in communication with programmable network platform 120, a library or other software module of programmable network platform 120, an application of programmable network platform 120 implemented in a distributed application (e.g., software-oriented architecture or micro-service) architecture, a combination of the above, or another type of unit. In some examples, capacity model unit 30 may be implemented in a different geographic location than colocation facility 10. Capacity model unit 30 may be operably coupled to PNP 120, such that capacity model unit 30 may communicate with PNP 120. As described in this disclosure, capacity model unit 30 may be implemented in hardware, software, or a combination of hardware and software. For example, capacity model unit 30 may be executed by one or more real servers or virtual machines in any of the colocation facilities described herein or a branch office of the facilities provider, or by another suitable computation environment. Capacity model unit 30 may be executed in a distributed manner. For example, generation of the capacity model may be performed by one or more servers.

Network device vendors may provide data that describes network device resource utilization by individual network device features, such as data that describes an individual network device feature's consumption of network device resources, e.g., CPU, memory, cache, etc., per instance of the network device feature. As one example, vendors measure and provide snapshots (e.g., as linear or non-linear graphs, tables, etc.) of network device resource utilization trends based on individual network device features (e.g. number of routes, VRFs, ACL, NATs, etc.) measured in isolation while minimizing or keeping other network device features constant. Each snapshot may include data that describes a network device feature's consumption of a network device resource based on scaling the feature. For example, for a given network device 24, 26, the network device vendor may provide data describing the consumption of network device memory while scaling the number of VRFs (where memory consumption is a dependent variable), data describing the consumption of network device memory while scaling the number of routes, data describing the consumption of network device memory while scaling the number of MAC entries, and so on with respect to a plurality of network devices features of the given network device 24, 26 such that the network device vendor provides data separately describing network device resource utilization for each of the plurality of network devices features. The network device vendor may provide data that describes such utilization for multiple different network device resources.

Resource utilization data 36 represents a database, a table, or other data structure stored to a storage device for storing the vendor provided data on an individual feature's consumption of network device resources. Resource utilization data 36 describes respective network device resource utilization by network device features for at least one of network devices 24, 26 and may be based on vendor-provided snapshots for network devices as described above. Capacity model unit 30 may use resource utilization data 36 according to techniques describe herein to assess the network device resource capacity of at least one of network devices 24, 26 to support one or more network device features required to provide a prospective service 28.

A customer associated with customer network 12A may use application(s) 130 to request, from programmable network platform 120, a prospective service 28. Application(s) 130 may issue a representation of the programmable network platform 120, which may determine whether to provision the prospective service 28 within colocation facility 10. Prospective services may include network services applied by a single device, such as NAT or policy-based Quality of Service as depicted by prospective service 28A for provisioning in router 24A; as well as network services that may be configured in multiple devices to cooperatively provide, e.g., interconnection between customer networks 12, as depicted by prospective service 28B that may be provisioned in one or more of networks devices 24, 26. In some examples, prospective service 28B is a prospective virtual circuit. Virtual circuits are described in further detail in U.S. patent application Ser. No. 15/099,407 and U.S. patent application Ser. No. 15/001,766, incorporated above.

Prospective services 28 are "prospective" in that the services have been requested but are not yet provisioned in the network infrastructure 20, for example. According to techniques described herein, a prerequisite for provisioning a prospective service 28 may be a positive assessment by capacity model unit 30 of the capacity of network devices 24, 26 to support the prospective service 28.

As described hereinafter with respect to prospective service 28B, a prospective service 28B may require a plurality of different network device features such that each of the plurality of network device features may consume the same network device resource of a network device 24, 26. For example, prospective service 28B may require a particular number of routes, a particular number of NAT entries, and a particular number of VRFs, and each of the network device features listed above may consume the network device resource of the control plane memory at a different utilization, described by resource utilization data 36. In this way, the combination of network device features collectively consumes one or more network device resources at a combined quantity. Again, using the above example, prospective service 28B may consume a maximum of 50 MB of control plane memory (one of the plurality of network device resources) because of consumed routes, NAT entries, and VRFs, collectively. This may be referred to as a multi-dimensional network device environment in that the different dimensions (network device features) consume one or more network device resources at different rates. The number of a network device feature used by a service (or collectively in use in a network device) may be alternatively referred to as the "scale" for the network device feature in that the usage of the network device is scaled up by the number of instances of the feature configured/in use, e.g., 50 VRFs or 20,000 MAC entries.

By using resource utilization data 36 to estimate network resource usage for different network device features needed to support the various network services provisioned on a given network device 24, 26 and aggregating the network device resource usage across the network device features in use to support existing network services, capacity model unit 30 may determine an estimated resource utilization of one or more network device resources for the one or more network services provisioned on the network device 24, 26. Moreover, capacity model unit 30 may determine whether one or more of network devices 24, 26 have sufficient network resources to accommodate prospective service 28B in view of existing network services (e.g., service 27) provisioned on network devices 24, 26. In some cases, capacity model unit 30 may determine whether one or more of network devices 24, 26 have sufficient network resources to accommodate multiple prospective services having respective features requirements as part of network infrastructure capacity planning for accommodating predicted customer and customer services growth.

Feature usage data 38 indicates the usage of network device features on a network device for one or more of network devices 24, 26. Feature usage data 38 may represent a database, table, or other data structure. Feature usage data 38 may specify the scale of a network device feature of a network device. In some cases, the scale is an estimated scale. For example, an operator may estimate a maximum number of MAC entries to be concurrently stored by a network device to be 20,000 for an estimated scale of 20,000 for the MAC entries network device feature. In some cases, the scale is an actual scale indicating the actual utilization of the network device feature. For example, an operator may configure a network device with 500 VRFs for an actual scale of 500 for the VRFs network device feature for the network device. Feature usage data 38 may include data obtained from network device configuration data by operation of a network monitoring or management protocol (e.g. Simple Network Management Protocol (SNMP) or Netconf). Feature usage data 38 may include data set by an operator. Feature usage data 38 may include data determined by applying a feature usage model for network services provisioned in network devices. For example, an Ethernet interconnection may typically require N MAC entries according to a feature usage model developed by the colocation facility 10 provider. Given MEthernet interconnections configured for router 24A, for instance, feature usage data 38 may indicate an estimated scale of (N×M) for the MAC entries network device feature for router 24A.

In some examples, programmable network platform 120 stores data describing network services provisioned in each of network devices 24, 26. Based on this data describing provisioned network services, capacity model unit 30 may generate feature usage data for each network device 24, 26. Feature usage data 38 may be distributed among multiple databases or other data structures.

Based on resource utilization data 36, capacity model unit 30 may apply a capacity model for a network device 24, 26 to assess the resource usage for multiple network device resources, provided existing network device features usage at respective scales indicated by feature usage data 38. A general capacity model for a network device is as follows:

$$R1_t = R1(f1,x1) + R1(f2,x2) + R1(f3,x3) + \ldots + R1(fn,xn)$$

$$R2_t = R2(f1,x1) + R2(f2,x2) + R2(f3,x3) + \ldots + R2(fn,xn)$$

$$Rn_t = Rn(f1,x1) + Rn(f2,x2) + Rn(f3,x3) + \ldots + Rn(fn,xn)$$

In the above example, each Ri (fk, xk) represents a network device feature fk's utilization of network device resource Ri at scale xk for the network device feature fk. Resource utilization data 36 indicates values for Ri (fk, xk). For example, $R1_t$ may represent the predicted total memory utilization value for router 24A. The VRF network device feature and routes network device feature may correspond to f1 and f2, respectively. In some examples, vendors may provide scale data showing R1 consumption based on the scaling from one to certain maximum scale limits (e.g., $f1_{max}$) of features f1 and f2. For example, at scale x1 (e.g., 500 VRFs), R1(VRF, 500) indicates the memory utilization value for 500 VRFs for the network device (e.g., router 24A) characterized by the capacity model. At scale x2 (e.g., 2000 routes), R2(routes, 2000) indicates the memory utilization value for 2000 routes for the network device (e.g., router 24A) characterized by the capacity model. By combining the memory utilization for each of the features at their respective scales, capacity model unit 30 may determine a total network device resource utilization value $R1_t$ for R1. Capacity model unit 30 may apply the capacity model to determine total network device resource utilization values for each of the n resources R1-Rn. In this way, capacity model unit 30 may generate, via a capacity model, predicted total resource utilization values for respective resources executing a plurality of features of a network device.

Capacity model unit 30 may in some cases apply device level constraints (C1-Cn) to the maximum possible resource utilization data values ($R1_{max}$-$Rn_{max}$). For example, $R1_{max}$ may specify a maximum amount of control plane memory available for the network device, e.g., 4 GB. Device level constraints of total resource amount values may include boundary constraints defining safe operating limits of network device resources. An example capacity model with applied constraints is as follows:

$$C1*R1_{max} >= R1(f1,x1) + R1(f2,x2) + R1(f3,x3) + \ldots + R1(fn,xn)$$

$$C2*R2_{max} >= R2(f1,x1) + R2(f2,x2) + R2(f3,x3) + \ldots + R2(fn,xn)$$

$$Cn*Rn_{max} >= Rn(f1,x1) + Rn(f2,x2) + Rn(f3,x3) + \ldots + Rn(fn,xn)$$

where (C1, C2, C3, . . . Cn) may represent device level constraint factors ($0 <= Ci <= 1$) for respective total resource amount values. The product of constraint factors and maximum available resource amounts may represent a network device resource constraint amount. Network device constraint factors (e.g., C1) may be set by the colocation facility provider to provide safe operating capacity margin which should not be exceeded while accommodating network device feature growth dynamically. Capacity model unit 30 may, using the capacity model for a network device based on resource utilization data 36 and feature usage data 38, determine whether respective network device resources may accommodate prospective service 28B based on the network device constraints. Though the example capacity model above is configured with an inequality relation of "less than or equal to," the capacity model may be configured with other inequality relations. In some examples, the provider may set constraints on the capacity model based on maximum scale limits of individual supported network device features, e.g., $f1_{max}, f2_{max}, \ldots fn_{max}$.

Continuing the example from above, capacity model unit 30 may generate a predicted total memory utilization value $R1_t$ corresponding to memory consumption by aggregating resource utilization of network device features (fk) such as VRFs, routes, and the other network device features (e.g., R1 (VRF, x1)+R1 (routes, x2)+ . . . +Rn (fn, xn)). Capacity model unit 30 may then apply a boundary constraint of less than or equal to 75% of the maximum allowed memory utilization value (i.e., C1=0.75 where $R1_{max}$ represents the maximum memory consumption possible for the network device), thereby establishing a safe operating point at 75% of the total maximum memory utilization value allowed, or $0.75*R1_{max}$. In other words, capacity model unit 30 may determine whether the memory utilization of router 24A will remain at or below the maximum possible memory utilization value by the multi-dimensional capacity model given scaled usage of the various features. As such, capacity model unit 30 may validate, for a particular network resource, whether the network may accommodate feature scale growth (fk, xk) resulting from prospective service 28.

In addition, by incorporating predicted network device feature usage by prospective service 28B, capacity model unit 30 may determine whether the network device has sufficient network device resource capacities to meet the constraints if the prospective service 28B were to be provisioned on the network device. For instance, capacity model unit 30 may aggregate existing network device feature usage data for a network device with predicted network device feature usage data for prospective service 28B to determine predicted network device feature usage data (e.g., scales x1-xn) of the network device if provisioned with the prospective service 28B. Based on the predicted network device feature usage data, the capacity model unit 30 may apply the capacity model and the constraints to determine whether the network device has spare capacity for prospective service 28B.

Capacity model unit 30 may provide an indication of whether the network device has capacity for prospective service 28B to programmable network platform 120, which may approve or deny the requested service accordingly. Programmable network platform 120 may in turn provide the indication to application(s) 130. In some cases, capacity model unit 30 may output an indication to the colocation facility 10 provider of a particular network device resource for a network device 24, 26 that does not meet a constraint (whether intrinsic or defined by the provider). In response, the provider may upgrade the network device resource to add capacity.

As a result of the techniques of this disclosure, the colocation facility 10 provider may facilitate "right-sizing" of network infrastructure 20 capacity in accordance with dynamic customer network service demands by improving an assessment accuracy of network device resource usage by provisioned services in a multi-dimensional feature usage environment. The techniques may in some cases provide resource-specific indications of additional network device resources needed for a given device to facilitate intelligent upgrades.

Figure 2:
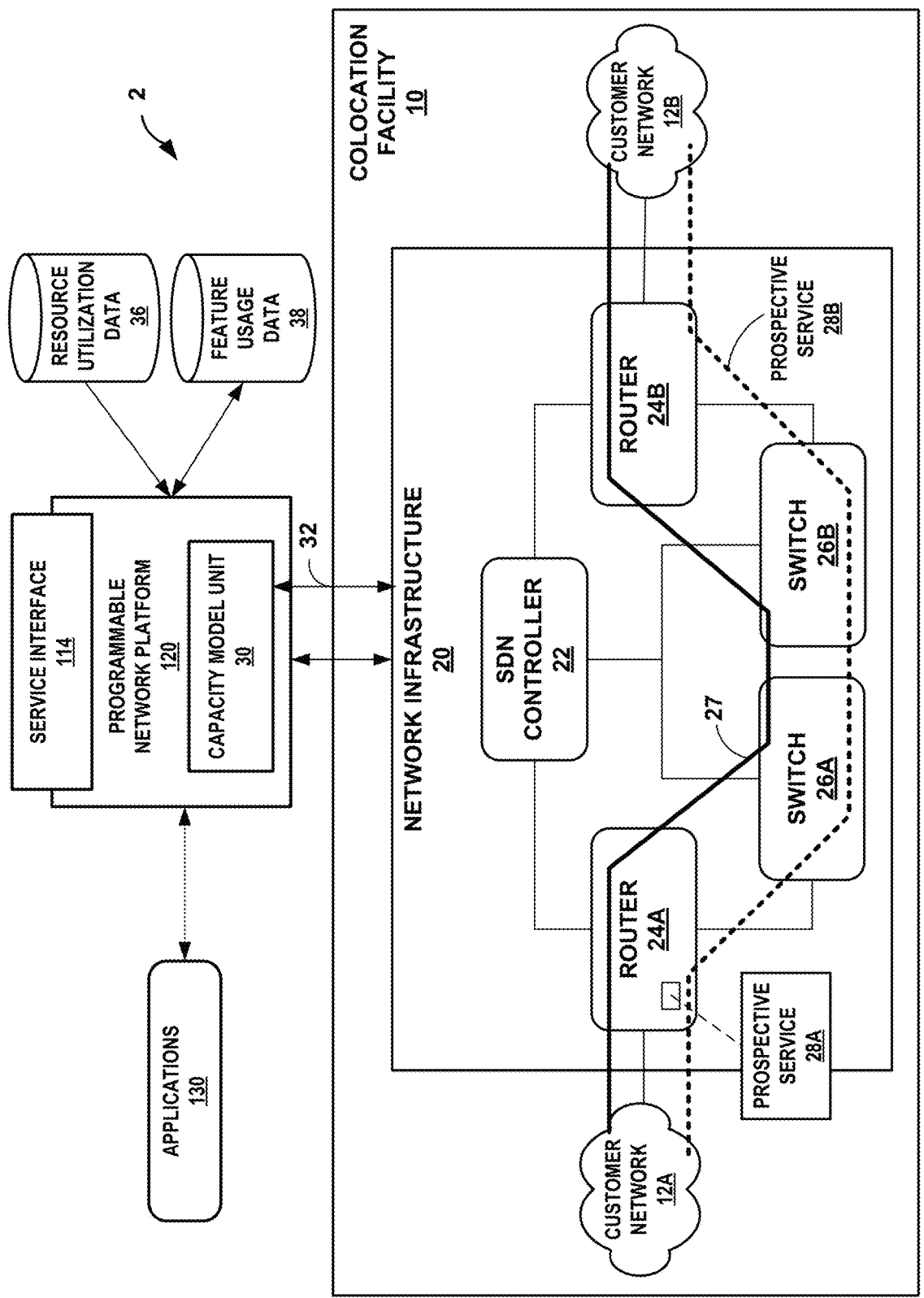
FIG. 2 is a block diagram that illustrates another example interconnection system having a programmable network platform that offers dynamic capacity assessment of network device resources of a colocation facility, in accordance with some example implementations described herein.

FIG. 2 is a block diagram that illustrates another example interconnection system 2 having a programmable network platform 120 that offers dynamic capacity assessment of network device resources of a colocation facility 10, in accordance with some example implementations described herein. Interconnection system 2 of FIG. 2 is similar to interconnection system 2 of FIG. 1, except as described below. In the example of FIG. 2, capacity model unit 30 may obtain feature usage data using one or more monitoring protocols 32 (e.g., SNMP, Netflow, Netconf, or other network device monitoring protocol) to track network device feature usage for network devices 24, 26.

As one example, PNP 120 may implement monitoring protocol 32 (e.g., SNMP) to automatically collect information about router 24A. When PNP 120 receives a request for prospective service 28B, PNP 120 may use monitoring protocol 32 to obtain features usage data by different network device features of router 24A. For example, router 24A may collect and organize information on its current configuration of features, including data describing respective scales for network device features. In one example, router 24A may indicate, via monitoring protocol 32, to PNP 120 that router 24A is provisioned with 500 VRFs and 1000 routes. As described above, PNP 120 may invoke capacity model unit 30 to aggregate the collected individual feature usage data about router 24A in feature usage data 38. Capacity model unit 30 may apply a capacity model for the plurality of network device features (e.g., VRFs and routes) consuming the memory of router 24A to determine a total memory utilization value for router 24A. Using this capacity model, capacity model unit 30 may determine whether the network device resources have sufficient capacity to handle prospective service 28B based on the features usage data 38 dynamically obtained from the network devices 24, 26 and further based on resource utilization data 36.

Figure 3:
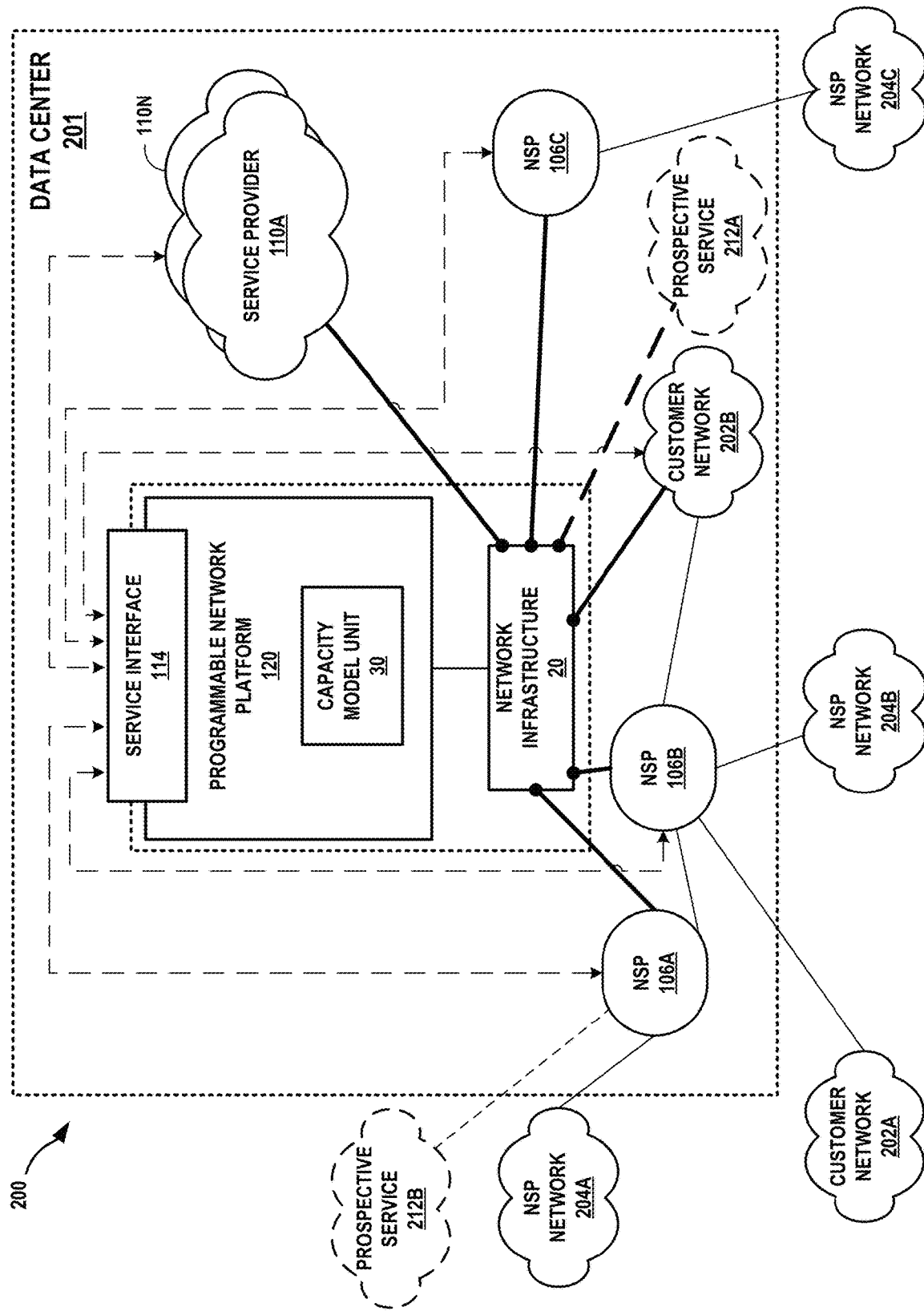
FIG. 3 is a block diagram illustrating an example data center that provides an operating environment for a colocation facility, and a capacity model unit that provides dynamic capacity assessment of network device resources, in accordance with techniques of the disclosure.

FIG. 3 is a block diagram illustrating an example data center 201 that provides an operating environment for a colocation facility 200, and a capacity model unit 130 that provides dynamic capacity assessment of network device resources, in accordance with techniques of the disclosure. Colocation facility 200 allows a corresponding one of customer networks 202A, 202B and NSP networks 204A-204C (collectively, "'private' or 'carrier' networks 204") of any NSPs 106A-106C or other customers to be directly cross-connected, via a layer 2 (L2) or layer 3 (L3) connection to any other customer network and/or to any of service providers 110A-110N, thereby allowing exchange of service traffic among the customer networks and service providers 110. Data center 201 may be entirely located within a centralized area, such as a warehouse or localized data center complex, and provide power, cabling, security, and other services to NSPs, customers, and service providers that locate their respective networks within the data center 201 (e.g., for colocation) and/or connect to the data center 201 by one or more external links.

Colocation facility 200 includes network infrastructure and an operating environment by which customers 202 may receive services from one or more service providers 110 via interconnections. An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via network infrastructure 20, and a cloud exchange in which customer routers peer with network infrastructure 20 (or "provider") routers rather than directly with other customers. Colocation facility 200 may provide, to enterprise customers, interconnection services to cloud services. That is, an interconnection service by colocation facility 200 provides access to services provided by service providers 110.

For interconnections at layer-3 or above, customers 202 may receive services directly via a layer 3 peering and physical connection to one of colocation facility exchange points or indirectly via one of NSPs 106. NSPs 106 provide "transit" by maintaining a physical presence within colocation facility 200 and aggregating layer 3 access from one or more customers 202. NSPs 106 may peer, at layer 3, directly with one or more colocation facility 200 and in so doing offer indirect layer 3 connectivity and peering to one or more customers 202 by which customers 202 may obtain services from the colocation facility 200.

In instances in which colocation facility 200 offers a cloud exchange, network infrastructure 20 may be assigned a different autonomous system number (ASN). Network infrastructure 20 is thus a next hop in a path vector routing protocol (e.g., BGP) path from service providers 110 to customers 202. As a result, colocation facility 200 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers 202. In other words, colocation facility 200 may internalize the eBGP peering relationships that service providers 110 and customers 202 would maintain on a pair-wise basis. Instead, a customer 202 may configure a single eBGP peering relationship with colocation 200 and receive, via the colocation facility, multiple services from one or more service providers 110. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 202B in FIG. 2 is illustrated as having contracted with the colocation facility provider for colocation facility 200 to directly access layer 3 services via colocation facility 200 and also to have contracted with NSP 106B to access layer 3 services via a transit network of the NSP 106B. Customer network 202A is illustrated as having contracted with NSP 106B to access layer 3 services via a transit network of NSP 106B. The contracts described above may be instantiated in network infrastructure of the colocation facility 200 by L3 peering configurations within switching devices of NSPs 106 and colocation facility 200 and L3 connections, e.g., layer 3 virtual circuits, established within colocation facility 200 to interconnect service provider 110 networks to NSPs 106 networks and customer 202 networks, all having at least one port offering connectivity within colocation facility 200.

In some examples, service providers 110 may be cloud service providers. Service providers 110 may offer such services as Software-as-a-Service (SaaS), Platform-aaS (PaaS), Infrastructure-aaS (IaaS), Virtualization-aaS (VaaS), and data Storage-aaS (dSaaS), via the colocation facility 200. Network service providers 106 may each represent a network service provider that is associated with a transit network by which network subscribers of the NSP 106 may access services offered by service providers 110 via the colocation facility 200. In general, customers of service providers 110 may include network carriers, large enterprises, managed service providers (MSPs), as well as other customers generally seeking any of the SaaS, PaaS, IaaS, VaaS, and dSaaS services offered by the service providers 110.

As shown in FIG. 3, capacity model unit 30 operated by the colocation facility provider of data center 201 may assess capacity of network infrastructure according to techniques described in this disclosure. Capacity model unit 30 may represent an example instance of any of capacity model unit 30 of FIGS. 1-2. As described above, capacity model unit 30 provides a capacity model to assess capacity of network device resources to determine whether the network device resources may accommodate prospective services.

In the example of FIG. 3, a customer network 202B is located in data center 201 and may be interconnected with other customers, service providers, and/or NSPs in data center 201. Another customer may be customer network 202A located external to data center 201 and connecting to data center 201 via one or more NSPs 106. Prospective services 212A, 212B may represent example instances of any of prospective services described here, e.g., an interconnection service, a NAT service, etc. Each of prospective services 212A, 212B (collectively, "prospective services 212") may use network device features of network devices in network infrastructure 20. As described above, a colocation facility provider may access PNP 120 to invoke capacity model unit 30 to assess capacity of network device resources to determine whether the network device resources may accommodate the one or more prospective services 212. In this way, capacity model unit 30 may enable colocation facility providers to dynamically determine whether current network devices may accommodate the prospective services 212 such that the colocation facility provider may accurately determine whether data center 201 necessitates increasing network device resources, e.g., by adding or upgrading routers, switches, servers, line cards, etc., of network infrastructure 20.

Figure 4A:
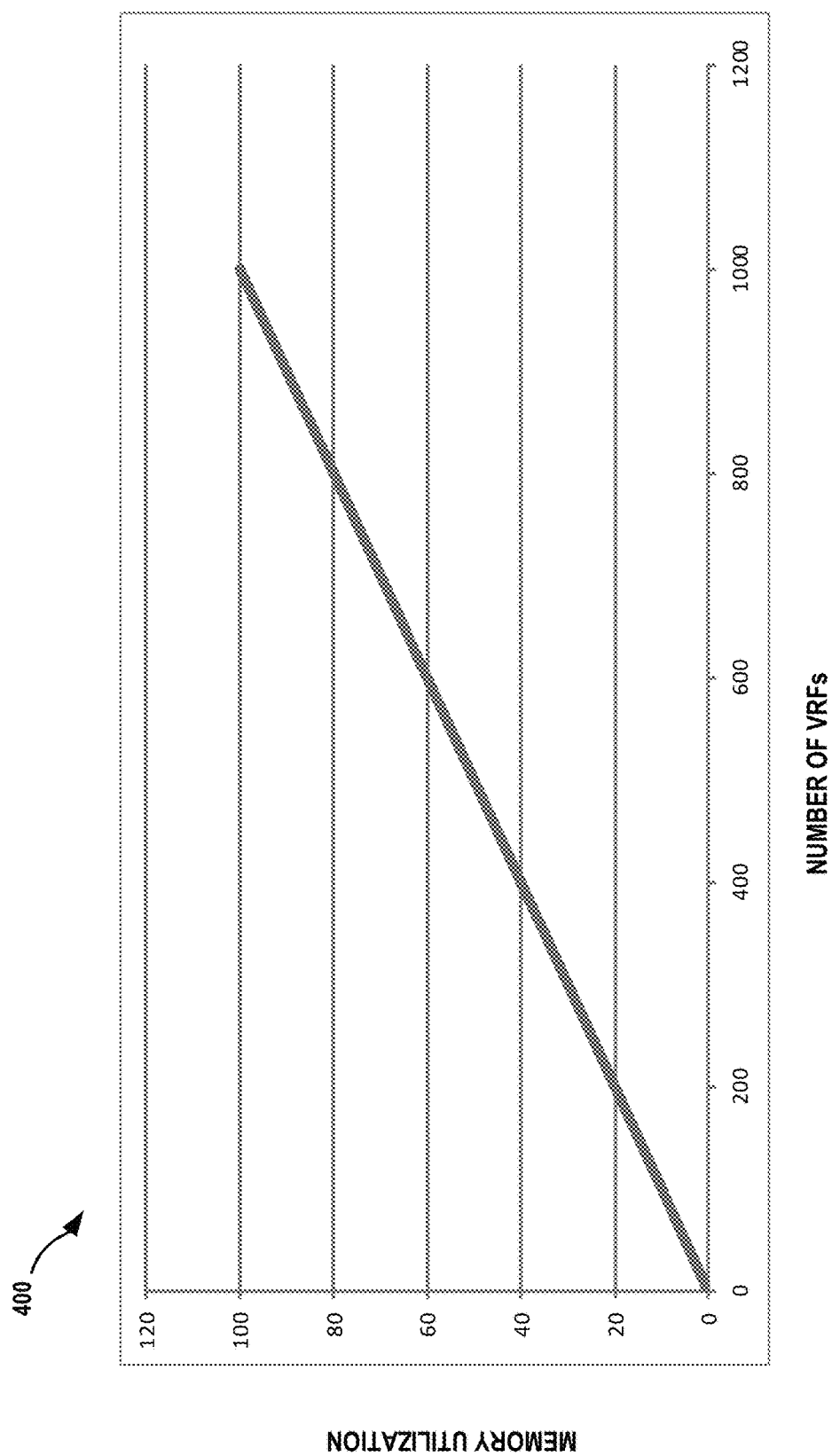
FIGS. 4A-4C depict example vendor specified performance graphs describing network device resource utilization by respective network device features, in accordance with techniques of this disclosure.
Figure 4B:
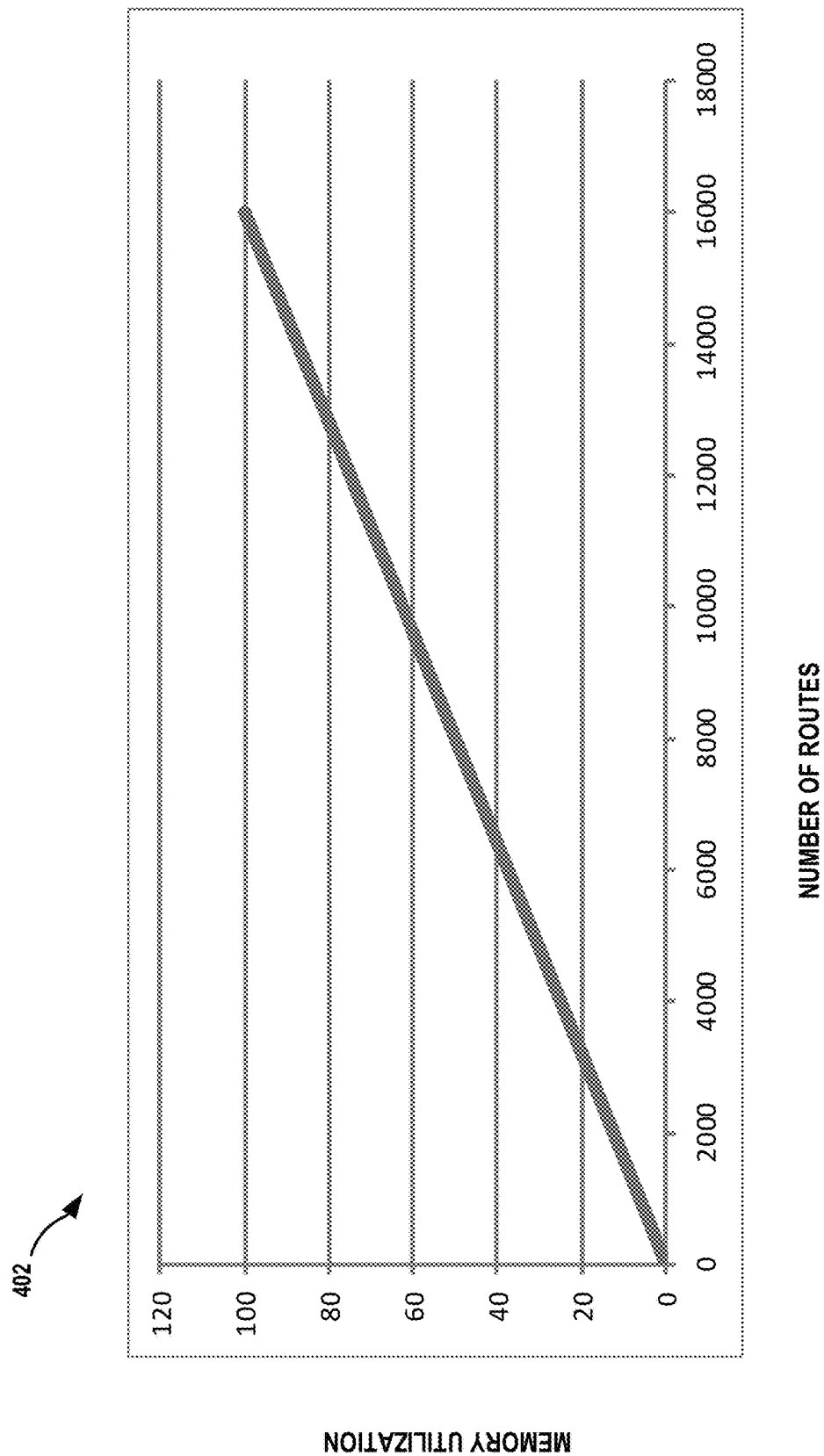
Figure 4C:
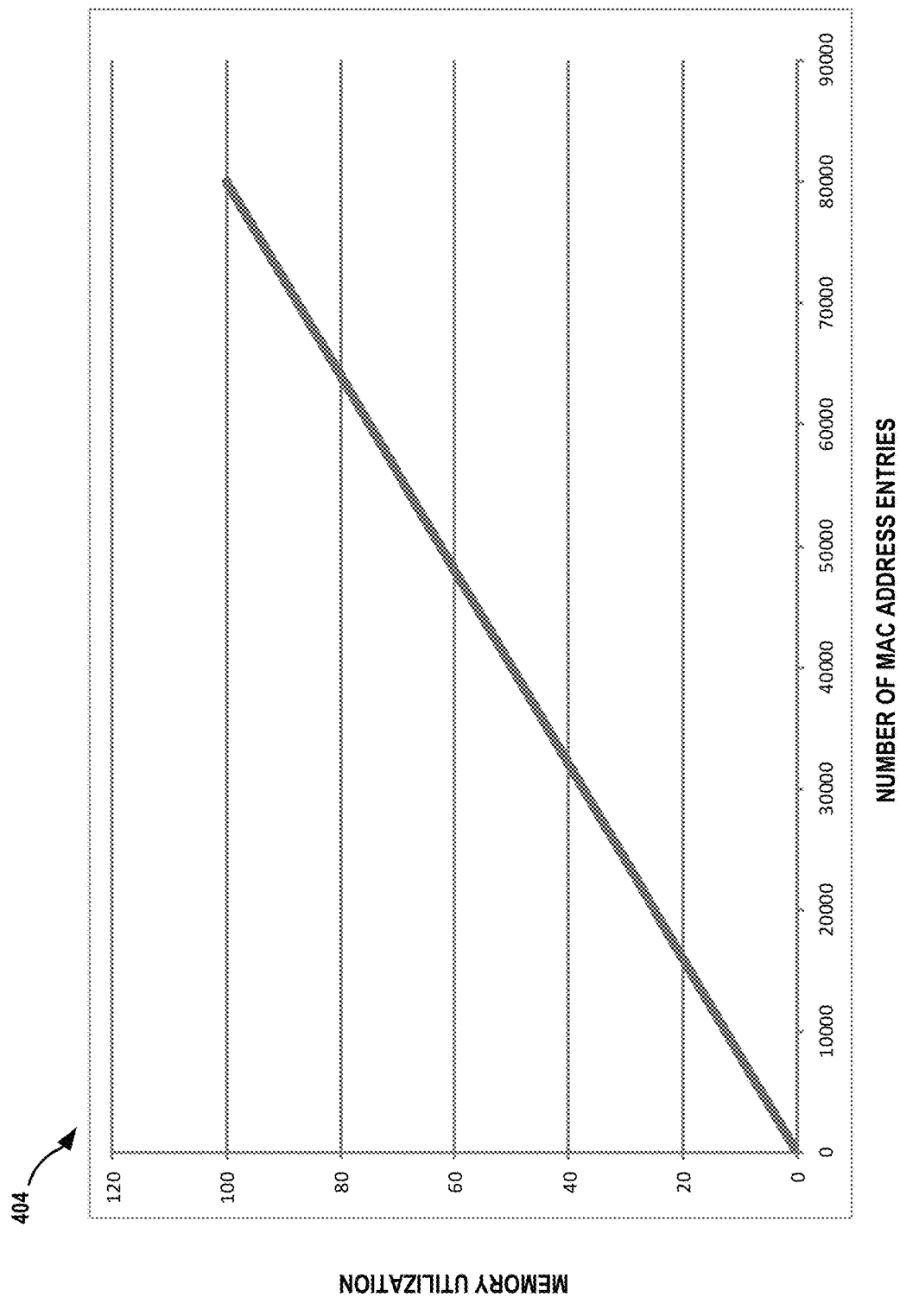

FIGS. 4A-4C depict example vendor specified performance graphs describing network device resource utilization by respective network device features, in accordance with techniques of this disclosure. Although the vendor specified data in FIGS. 4A-4C illustrate resource utilization as linearly related to feature scale, the relationship between resource utilization and feature scale may be non-linear. FIGS. 4A-4C illustrate examples of vendor specified graphs, but vendor specified data may include tables, charts, formulas, or other data that describes a network device resource utilization by a network device feature according to a scale of the network device feature.

FIG. 4A illustrates an example vendor specified graph 400 illustrating, for a particular type of network device, the relationship between a number of VRFs provisioned in the network device and network device memory utilization, where VRFs are an example of a network device feature and memory is an example of a network device resource. In the example of FIG. 4A, 1000 VRFs consume 100 percent of the network device memory. Vendor specified data on VRFs also provide memory utilization data based on respective scales of VRFs. For example, according to the vendor specified graph illustrated in FIG. 4A, 500 VRFs consume 50 percent of the network device memory. In some examples, memory or other network device feature usage may be expressed in vendor-supplied data as usage data (e.g., 40 MB, 100 Gbps) rather than as a percentage utilization.

FIG. 4B illustrates another example vendor specified graph 402 illustrating, for a particular type of network device, the relationship between a number of routes stored in the network device and network device memory utilization, where routes are an example of a network device feature and memory is an example of a network device resource. In the example of FIG. 4B, 16,000 routes consume 100 percent of the router's memory. Vendor specified data on routes also provide memory utilization data based on respective scales of routes. For example, according to the vendor specified graph illustrated in FIG. 4B, 1000 routes consume 6.25 percent of the memory. In some examples, memory or other network device feature usage may be expressed in vendor-supplied data as usage data (e.g., 40 MB, 100 Gbps) rather than as a percentage utilization.

FIG. 4C illustrates another example vendor specified graph 404 illustrating, for a particular type of network device, the relationship between a number of MAC address entries stored in the network device and network device memory utilization, where MAC address entries are an example of a network device feature and memory is an example of a network device resource. In the example of FIG. 4C, 80,000 MAC address entries consume 100 percent of the router's memory. Vendor specified data on MAC address entries also provide memory utilization data based on respective scales of MAC address entries. For example, according to the vendor specified graph illustrated in FIG. 4C, 20,000 MAC address entries consume 25 percent of the memory. In some examples, memory or other network device feature usage may be expressed in vendor-supplied data as usage data (e.g., 40 MB, 100 Gbps) rather than as a percentage utilization.

In one example, a network device may be provisioned with 500 VRFs, 1000 routes, and 20,000 MAC address entries, which collectively consume memory from a network device (e.g., router 24A of FIG. 1) in the colocation facility according to resource utilization data represented by charts 400, 402, and 404. A customer or the colocation facility 10 provider may request a prospective service that may require an additional 3000 routes that consume the memory. As described above, a colocation facility provider may access programmable network platform 120 to invoke capacity model unit 30 to determine whether the router's memory may accommodate the additional network device features estimated as required for the prospective network service. In this example, capacity model unit 30 may aggregate the memory consumption data of VRFs, routes, and MAC address entries based on the vendor specified data in charts 400, 402, and 404. Colocation facility provider may determine based on chart 400 that 500 VRFs utilizes 50 percent of the router's memory. The colocation facility provider may also determine based on the chart 402 that 1000 routes consumes 6.25 percent of the router's memory. The colocation facility provider may also determine based on chart 404 that 20,000 MAC address entries consumes 25 percent of the router's memory. In some examples, the resource utilization data 36 of FIG. 1 may include data from charts 400, 402, and 404. Charts 400, 402, and 404 are merely examples. Actual relationships between network device features and network device resource usage will vary by network device features, network device resource, network device type/model and resource provisioning, and network device manufacturer.

In accordance with the techniques of this disclosure, capacity model unit 30 may calculate a total resource utilization value (e.g., memory) based on an aggregation of the feature utilization data determined from the estimate feature usage and resource utilization data represented at least in part by charts 400, 402, and 404. In this example, capacity model unit 30 may calculate a total memory utilization value of 81.25 percent for a multi-dimensional environment for the network device including 500 VRFs, 1000 routes, and 20,000 MAC address entries. A colocation facility provider may determine based on chart 402 that the addition of 3000 routes consumes 20 percent of the router's memory. Accordingly, the colocation facility provider may use capacity model unit 30 to dynamically determine that the router's current memory utilization (e.g., 81.25 percent) cannot accommodate the addition of 3000 routes (e.g., 20 percent). As described above, capacity model unit 30 may provide an indication of whether the network device has capacity for the prospective service (e.g., the 3000 routes) to programmable network platform 120, which may approve or deny the requested service accordingly. In this way, the colocation facility provider may accurately determine in a multi-dimensional environment whether the router has the capacity to accommodate a prospective service thereby eliminating overly conservative/aggressive capacity assessment of network device resources.

Figure 5:
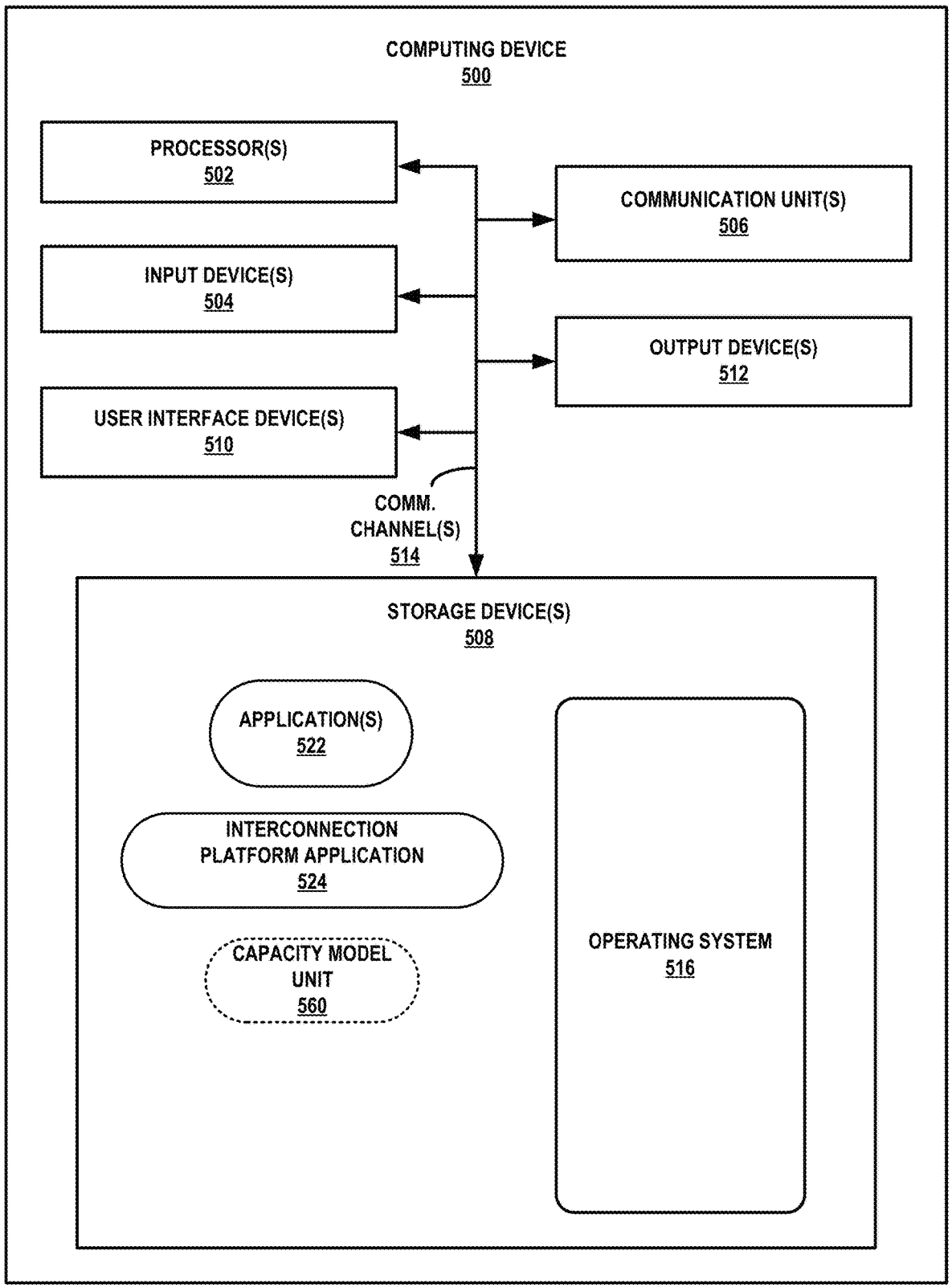
FIG. 5 is a block diagram illustrating an example computing device that provides dynamic capacity assessment of network device resources of a colocation facility, in accordance with some example implementations described herein.

FIG. 5 is a block diagram illustrating one example of a computing device that operates in accordance with one or more techniques of the present disclosure. FIG. 5 may illustrate a particular example of a server or other computing device 500 that includes one or more processor(s) 502 for executing any one of capacity model unit 30 of FIGS. 1-3, or any other computing device described herein. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be colocated or in the same chassis as other components). Computing device 500 may be located and execute, for example, another interconnection facility, or at a branch office or cloud computing environment employed or used by a colocation facility provider.

As shown in the specific example of FIG. 5, computing device 500 includes one or more processors 502, one or more input devices 504, one or more communication units 506, one or more output devices 512, one or more storage devices 508, and one or more user interface (UI) devices 510. Computing device 500, in one example, further includes one or more applications 522, interconnection platform application 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G, 4G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and interconnection platform application 524 with processors 502, communication unit 506, storage device 508, input device 504, user interface device 510, and output device 512.

Application 522 and interconnection platform application 524 may also include program instructions and/or data that are executable by computing device 500.

Capacity model unit 560 may include instructions for causing computing device to perform the techniques described in the present disclosure with respect to capacity model unit 30. As one example, capacity model unit 560 may include instructions that cause computing device 500 to dynamically assess capacity of network devices of a network data center in a cloud-based services exchange and/or colocation facility in accordance with the techniques of this disclosure.

Figure 6:
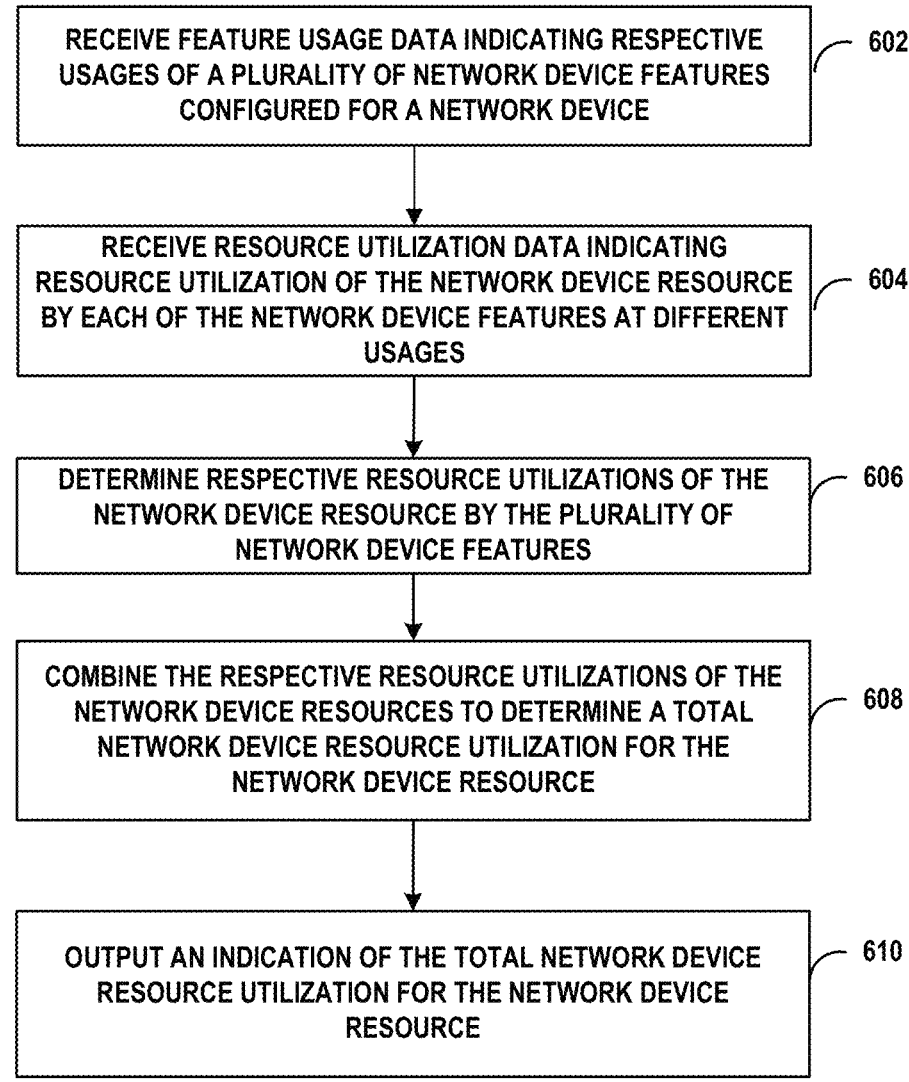
FIG. 6 is an example flowchart illustrating a method for dynamically assessing capacity of network devices of a network data center, in accordance with techniques of this disclosure.

FIG. 6 is a flowchart illustrating an example mode of operation for assessing capacity of network device resources of a colocation facility, in accordance with techniques of this disclosure. The techniques are described with respect to a capacity model unit 30 of FIGS. 1-3. In the example of FIG. 6, a capacity model unit may receive feature usage data that indicates respective usages of a plurality of network device features configured for a network device (602). In some examples, the capacity model unit may receive feature usage data by operation of a network monitoring or management protocol. In some examples, the capacity model unit may receive feature usage data set by an operator of the colocation facility.

Capacity model unit may receive resource utilization data indicating resource utilization of the network device resource by each of the network device features at different usages (604). As described above, network device vendors may provide data that describes network device resource utilization by individual network device features, such as data that describes an individual network device feature's consumption of network device resources. Vendors may provide data that describes a network device feature's consumption of a network device resource based on scaling the feature. Capacity model unit may receive resource utilization data to assess the network device resource capacity of a network device.

Capacity model unit may, via a capacity model, determine respective resource utilizations of the network device resource by the plurality of network device features (606). For example, capacity model unit may apply a capacity model to determine respective resource utilizations of the network device resource based on resource utilization data and feature utilization data. The capacity model may calculate a respective network device feature's utilization of a network device resource for the network device feature.

Capacity model unit may combine the respective resource utilizations of the network device resources to determine a total network device resource utilization for the network device resource (608). For example, capacity model unit may aggregate the respective resource utilizations of the network device features to generate a predicted total resource utilization value for respective resources executing a plurality of features of a network device. The total network device resource utilization provides a more accurate assessment of total resource utilization for a multi-dimensional environment. Capacity model unit may output an indication of the total network device resource utilization for the network device resource (610).

In some examples, once the total resource utilization is obtained for all the resource components of a network device (e.g., control processor memory ($R1_t$), control processor CPU ($R2_t$), forwarding processor memory ($R3_t$), forwarding processor CPU ($R4_t$), etc.) based on feature usage data and resource utilization data, capacity model unit may receive a maximum possible resource utilization of the network device resource. Capacity model unit may also receive constraint data (e.g., ($Ci*Ri_{max}$)) that indicates a constraint on the maximum possible resource utilization for the network device resource. Capacity model unit may further apply the constraint data to the maximum possible resource utilization to configure a safe operating boundary for the network device resource. Capacity model unit may further output an indication of whether the total network device resource utilization for the network device resource exceeds the safe operating boundary for the network device resource.

In some examples, for prospective services to be accepted, the boundary constraints (e.g., $C1*R1_{max}$, $C2*R2_{max}$, $C3*R3_{max}$, ... $Cn*Rn_{max}$) for all resources may need to be satisfied. Satisfying one network device resource may not be enough to accommodate the requested service. In this case, if prospective service meets the constraint for control processor memory, but fails on the constraint for control processor CPU, the network resources may not accommodate the prospective service. As a result, the capacity model unit may output an indication that the network resources may not accommodate the prospective service.

Capacity model unit may approve or deny the requested service accordingly. In some cases, capacity model unit may output an indication to the colocation facility provider of a particular network device resource for a network device whether the total network device resource utilization for the network device resource satisfies the one or more thresholds (612).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a capacity model unit executing at a computing device, feature usage data indicating, for each network device feature of a plurality of network device features, a number of instances of the network device feature stored by a network device that uses the network device feature to implement one or more interconnection services configured in the network device, wherein each of the interconnection services interconnects two networks and wherein the network device comprises one of a switch or a router;
receiving, by the capacity model unit, resource utilization data indicating, for each network device feature of the network device features, resource utilization of a network device resource of the network device for different numbers of instances of the network device feature stored by the network device;
determining, by the capacity model unit, for each network device feature of the network device features and based on the resource utilization data, resource utilization of the network device resource by the number of instances of the network device feature stored by the network device as indicated by the feature usage data;
combining, by the capacity model unit, the respective resource utilizations of the network device resource by the network device features to determine a total network device resource utilization for the network device resource; and
outputting, by the capacity model unit and based on the total network device resource utilization and the resource utilization data, an indication of whether the network device resource has capacity to implement a prospective interconnection service that will require additional instances of one or more of the plurality of network device features,
wherein outputting the indication of whether the network device resource has capacity to implement the prospective interconnection service comprises outputting, by the capacity model unit, an indication the network device resource has capacity to implement the prospective interconnection service to cause a programmable network platform to configure the network device with the prospective interconnection service.

2. The method of claim 1, wherein the network device is deployed by a colocation facility provider within a colocation facility and configured to provide the one or more interconnection services to networks colocated within the colocation facility.

3. The method of claim 2, wherein the network device resource has capacity to implement the prospective interconnection service, the method further comprising:
receiving, by a programmable network platform of the colocation provider that configures network infrastructure of the colocation facility to provide the one or more interconnection services, a request for the prospective interconnection service; and
provisioning, by the programmable network platform and in response to receiving the indication the network device resource has capacity to implement the prospective interconnection service, the prospective interconnection service on the network device.

4. The method of claim 3, further comprising:
receiving, by the capacity model unit, a maximum possible resource utilization of the network device resource,
receiving, by the capacity model unit, constraint data that indicates a constraint on the maximum possible resource utilization;
applying the constraint data to the maximum possible resource utilization to determine a safe operating boundary for the network device resource; and
comparing, by the capacity model unit, the total network device resource utilization against the safe operating boundary for the network device resource,
wherein outputting the indication of the total network device resource utilization for the network device resource comprises outputting an indication of whether the total network device resource utilization for the network device resource exceeds the safe operating boundary for the network device resource.

5. The method of claim 4, further comprising:
outputting, by the programmable network platform based on the indication of whether the total network device resource utilization for the network device resource exceeds the constraint amount for the network device resource, an indication of whether the network device has capacity for the prospective interconnection service.

6. The method of claim 1,
wherein the network device resource comprises a first network device resource of a plurality of network device resources, wherein the resource utilization data indicates resource utilization of each of the plurality of network device resources by each of the network device features at various usages according to Ri(fk, xk), where Ri specifies a resource utilization of the ith one of the plurality of network device resources, fk identifies a kth one of the plurality of network device features, and xk represents a scale value of the number of instances of the kth one of the plurality of network device features.

7. The method of claim 6, wherein combining the respective resource utilizations to determine a total network device resource utilization for the network device resource comprises combining the respective resource utilizations according to: $Rit=Ri(f1,x1)+Ri(f2,x2)+Ri(f3,x3)+\ldots+Ri(fn,xn)$, where Rit is the total network device resource utilization of the ith one of the plurality of network device resources, f1 to fn identify the plurality of network device features, and x1 to xn represent respective numbers of instances of the plurality of network device features f1 to fn.

8. The method of claim 1, further comprising:
receiving, by the capacity model unit, constraint data that indicates a constraint on the total network device resource utilization for the network device resource that defines a safe operating boundary for the network device resource; and
applying the constraint data to the total network device resource utilization for the network device resource to determine a constraint amount for the network device resource,
wherein outputting the indication of the total network device resource utilization for the network device resource comprises outputting an indication of whether the total network device resource utilization for the network device resource exceeds the constraint amount for the network device resource.

9. The method of claim 1, wherein the resource utilization data indicates, for a plurality of network device resources, respective resource utilizations of the network device resources by each of the network device features at different usages, the method further comprising:
determining, by the capacity model unit for each network device resource based on the feature usage data and the resource utilization data, respective resource utilizations of each network device resource by the plurality of network device features; and
combining, by the capacity model unit for each network device resource, the respective resource utilizations of the network device resource to determine a total network device resource utilization for each network device resource.

10. The method of claim 1, wherein receiving the feature usage data comprises:
receiving, by the capacity model unit from the network device via at least one network device monitoring protocol session, the feature usage data.

11. The method of claim 1, wherein the network device resource comprises one of control plane memory, data plane memory, and control plane central processing unit utilization.

12. The method of claim 1, where at least one of the plurality of network device features comprises one of a number of virtual routing and forwarding instances, a number of media access control entries, a number of routes, and a number of network address translations.

13. A computing device comprising:
at least one computer processor; and
a memory comprising instructions that when executed by the at least one computer processor cause the at least one computer processor to:
receive feature usage data indicating, for each network device feature of a plurality of network device features, a number of instances of the network device feature stored by a network device that uses the network device feature to implement one or more interconnection services configured in the network device, wherein each of the interconnection services interconnects two networks and wherein the network device comprises one of a switch or a router;
receive resource utilization data indicating, for each network device feature of the network device features, resource utilization of a network device resource of the network device for different numbers of instances of the network device feature stored by the network device;
determine, for each network device feature of the network device features and based on the resource utilization data, resource utilization of the network device resource by the number of instances of the network device feature stored by the network device as indicated by the feature usage data;
combine the respective resource utilizations of the network device resource by the network device features to determine a total network device resource utilization for the network device resource; and
output, based on the total network device resource utilization and the resource utilization data, an indication of whether the network device resource has capacity to implement a prospective interconnection service that will require additional instances of one or more of the plurality of network device features,
wherein to output the indication of whether the network device resource has capacity to implement the prospective interconnection service, the instructions cause the at least one computer processor to: output an indication the network device resource has capacity to implement the prospective interconnection service to cause a programmable network platform to configure the network device with the prospective interconnection service.

14. The computing device of claim 13, wherein the network device resource has capacity to implement the prospective interconnection service, wherein the instructions cause the at least one computer processor to:
configure network infrastructure of a colocation facility to provide the one or more interconnection services to customer networks of customers colocated within the colocation facility;
receive a request for the prospective interconnection service; and
provision, in response to receiving the indication of the network device resource has capacity to implement the prospective interconnection service, the prospective interconnection service on the network device.

15. The computing device of claim 14, wherein the instructions cause the at least one computer processor to:
receive constraint data that indicates a constraint on the total network device resource utilization for the network device resource that defines a safe operating boundary for the network device resource; and
apply the constraint data to the total network device resource utilization for the network device resource to determine a constraint amount for the network device resource, wherein to output the indication of the total network device resource utilization for the network device resource comprises outputting an indication of whether the total network device resource utilization for the network device resource exceeds the constraint amount for the network device resource.

16. The computing device of claim 15, wherein the instructions cause the at least one computer processor to:
generate for display, based on the indication of whether the total network device resource utilization for the network device resource exceeds the constraint amount for the network device resource, an indication of whether the network device has capacity for the prospective interconnection service.

17. The computing device of claim 13, wherein the instructions causing the at least one computer processor to:
receive constraint data that indicates a constraint on the total network device resource utilization for the network device resource that defines a safe operating boundary for the network device resource; and
apply the constraint data to the total network device resource utilization for the network device resource to determine a constraint amount for the network device resource,
wherein to output the indication of the total network device resource utilization for the network device resource comprises outputting an indication of whether the total network device resource utilization for the network device resource exceeds the constraint amount for the network device resource.

18. A system comprising:
a colocation facility comprising network infrastructure to provide one or more network services to customer networks of customers colocated within the colocation facility;
a programmable network platform configured for execution by one or more computing devices of a colocation facility provider for the colocation facility to configure the network infrastructure to provide the one or more networks services, the programmable network platform configured to:

receive feature usage data indicating, for each network device feature of a plurality of network device features, a number of instances of the network device feature stored by a network device that uses the network device feature to implement one or more interconnection services configured in the network device, wherein each of the interconnection services interconnects two networks and wherein the network device comprises one of a switch or a router;
receive resource utilization data indicating, for each network device feature of the network device features, resource utilization of a network device resource of the network device for different numbers of instances of the network device feature stored by the network device;
determine, for each network device feature of the network device features and based on the resource utilization data, resource utilization of the network device resource by the number of instances of the network device feature stored by the network device as indicated by the feature usage data;
combine the respective resource utilizations of the network device resource by the network device features to determine a total network device resource utilization for the network device resource; and
output, based on the total network device resource utilization and the resource utilization data, an indication of whether the network device resource has capacity to implement a prospective interconnection service that will require additional instances of one or more of the plurality of network device features, wherein to output the indication of whether the network device resource has capacity to implement the prospective interconnection service the programmable network platform is configured to output an indication the network device resource has capacity to implement the prospective interconnection service to cause the programmable network platform to configure the network device with the prospective interconnection service.

* * * * *